(12) United States Patent
Sigal et al.

(10) Patent No.: US 10,776,662 B2
(45) Date of Patent: Sep. 15, 2020

(54) WEAKLY-SUPERVISED SPATIAL CONTEXT NETWORKS TO RECOGNIZE FEATURES WITHIN AN IMAGE

(71) Applicant: Disney Enterprises, Inc., Burbank, CA (US)

(72) Inventors: Leonid Sigal, Pittsburgh, PA (US); Zuxuan Wu, College Park, MD (US)

(73) Assignee: Disney Enterprises, Inc., Burbank, CA (US)

( * ) Notice: Subject to any disclaimer, the term of this patent is extended or adjusted under 35 U.S.C. 154(b) by 295 days.

(21) Appl. No.: 15/808,759

(22) Filed: Nov. 9, 2017

(65) Prior Publication Data
US 2019/0138850 A1     May 9, 2019

(51) Int. Cl.
*G06K 9/62*     (2006.01)
*G06K 9/20*     (2006.01)
(Continued)

(52) U.S. Cl.
CPC ......... *G06K 9/6256* (2013.01); *G06K 9/2054* (2013.01); *G06K 9/3241* (2013.01);
(Continued)

(58) Field of Classification Search
CPC ...... G06K 9/6267; G06K 9/6228; G06K 9/66; G06K 9/00684; G06K 9/2054;
(Continued)

(56) References Cited

U.S. PATENT DOCUMENTS 9,633,268 B1 * 4/2017 Ma ..................... G06K 9/00342
10,297,070 B1 * 5/2019 Zhu ....................... G06T 15/205
(Continued)

FOREIGN PATENT DOCUMENTS

WO    WO-2017004803 A1 *  1/2017  ........... G06K 9/4628

OTHER PUBLICATIONS

Guo-Sen et al., Hybrid CNN and Dictionary-Based Models for Scene Recognition and Domain Adaptation, 2016, Transaction on Circuits and Systems for Video Technology, pp. 1-12.*
(Continued)

*Primary Examiner* — Guillermo M Rivera-Martinez
(74) *Attorney, Agent, or Firm* — Patterson + Sheridan, LLP

(57) ABSTRACT

Systems, methods and articles of manufacture for training a convolutional neural network for feature recognition within digital images. A spatial context neural network is trained using a plurality of patches cropped from a plurality of digital images, the spatial context neural network comprising a first convolutional neural network configured to predict a feature representation for a first specified portion of a first digital image, a second convolutional neural network configured to compute a feature representation for a second specified portion of a second digital image, and a spatial context module that accepts output of the first and second convolutional neural networks as input. The second convolutional neural network is refined by regressing features of the second convolutional neural network to features of the first convolutional neural network. The refined second convolutional neural network is used to recognize one or more features within a third digital image.

20 Claims, 6 Drawing Sheets

(51) Int. Cl.
*G06K 9/48* (2006.01)
*G06N 3/08* (2006.01)
*G06K 9/32* (2006.01)
*G06K 9/46* (2006.01)
*G06K 9/72* (2006.01)

(52) U.S. Cl.
CPC .......... *G06K 9/4628* (2013.01); *G06K 9/481* (2013.01); *G06K 9/72* (2013.01); *G06N 3/084* (2013.01)

(58) Field of Classification Search
CPC .. G06K 9/3233; G06K 9/726; G06K 9/00624; G06T 2207/20081; G06T 2207/20076; G06T 7/73; G06T 7/74; G06F 17/2785
See application file for complete search history.

(56) References Cited

U.S. PATENT DOCUMENTS

| | | | | |
|---|---|---|---|---|
| 2015/0139485 | A1* | 5/2015 | Bourdev | G06K 9/6292 382/103 |
| 2015/0238148 | A1* | 8/2015 | Georgescu | A61B 5/7267 600/408 |
| 2016/0350653 | A1* | 12/2016 | Socher | G06N 5/04 |
| 2017/0011279 | A1* | 1/2017 | Soldevila | G06F 16/5846 |
| 2017/0061250 | A1* | 3/2017 | Gao | G06F 16/3347 |
| 2017/0132526 | A1* | 5/2017 | Cohen | G06N 3/0454 |
| 2017/0287170 | A1* | 10/2017 | Perona | G06K 9/0063 |
| 2017/0308753 | A1* | 10/2017 | Wu | G06T 7/62 |
| 2018/0129919 | A1* | 5/2018 | Tang | G06K 9/4628 |
| 2018/0157969 | A1* | 6/2018 | Xie | G06N 3/063 |
| 2018/0218275 | A1* | 8/2018 | Arrigoni | G06F 17/16 |
| 2018/0232640 | A1* | 8/2018 | Ji | G06N 3/082 |
| 2018/0307976 | A1* | 10/2018 | Fang | G06F 7/523 |
| 2019/0073562 | A1* | 3/2019 | Stolikj | G06K 9/00288 |

OTHER PUBLICATIONS

H. Park et al., Look Wider to Match Image Patches with Convolutional Neural Networks, Sep. 19, 2017—IEEE Signal Processing Letters, vol. PP, No. 99, pp. 1-5.*
Deshpande et al., The 9 Deep Learning Papers You Need to Know About (Understanding CNNs Part 3), Aug. 24, 2016, https://adeshpande3.github.io/The-9-Deep-Learning-Papers-You-Need-To-Know-About.html, pp. 1-17.*
Simonyan et al., Very Deep Convolutional Networks for Large-Scale Image Recognition, Apr. 2015, ICLR 2015, pp. 1-14.*

* cited by examiner

WEAKLY-SUPERVISED SPATIAL CONTEXT NETWORKS TO RECOGNIZE FEATURES WITHIN AN IMAGE

BACKGROUND

Field of the Invention

The present disclosure relates to digital image processing, and more specifically, to improved techniques for recognizing features within digital images using a spatial context neural network.

Description of the Related Art

Recent advances in object categorization, detection and segmentation have been fueled by high capacity deep learning models from large, labeled data sets. However, the large-scale human supervision that is required for many of these methods limits their use for some applications. This is particularly the case with fine-grained object-level tasks such as detection or segmentation, where the annotation requirements can be become so costly and unwieldy as to render the methods impractical. One solution is to use a pre-trained model for other, potentially unrelated, image tasks, and while such pre-trained models can produce effective and highly generic feature representations, fine-tuning with task-specific labeled samples is often necessary. Moreover, while unsupervised learning techniques can be used to potentially address some of these challenges, unsupervised models have not produced representations that can rival pre-trained models, much less surpass them.

SUMMARY

One embodiment provides a method and system that include training a spatial context neural network using a plurality of patches cropped from a plurality of digital images. The spatial context neural network includes a first convolutional neural network configured to predict a feature representation for a first specified portion of a first digital image, a second convolutional neural network configured to compute a feature representation for a second specified portion of a second digital image, and a spatial context module that accepts output of the first and second convolutional neural networks as input. The method and system include refining the second convolutional neural network, by regressing features of the second convolutional neural network to features of the first convolutional neural network. Additionally, the method and system include using the refined second convolutional neural network to recognize one or more features within a third digital image.

Another embodiment described herein provides a non-transitory computer-readable memory containing computer program code that, when executed by operation of the one or more computer processors, performs an operation. The operation includes retrieving a first convolutional neural network configured to predict a feature representation for a first patch of a first digital image. The operation also includes refining the first convolutional neural network by regressing features of the first convolutional neural network to features of a second convolutional neural network, wherein the second convolutional neural network is configured to predict a feature representation for a second patch of the first digital image, based on an offset between the first patch and the second patch. Additionally, the operation includes using the refined second convolutional neural network to recognize one or more features within a second digital image.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
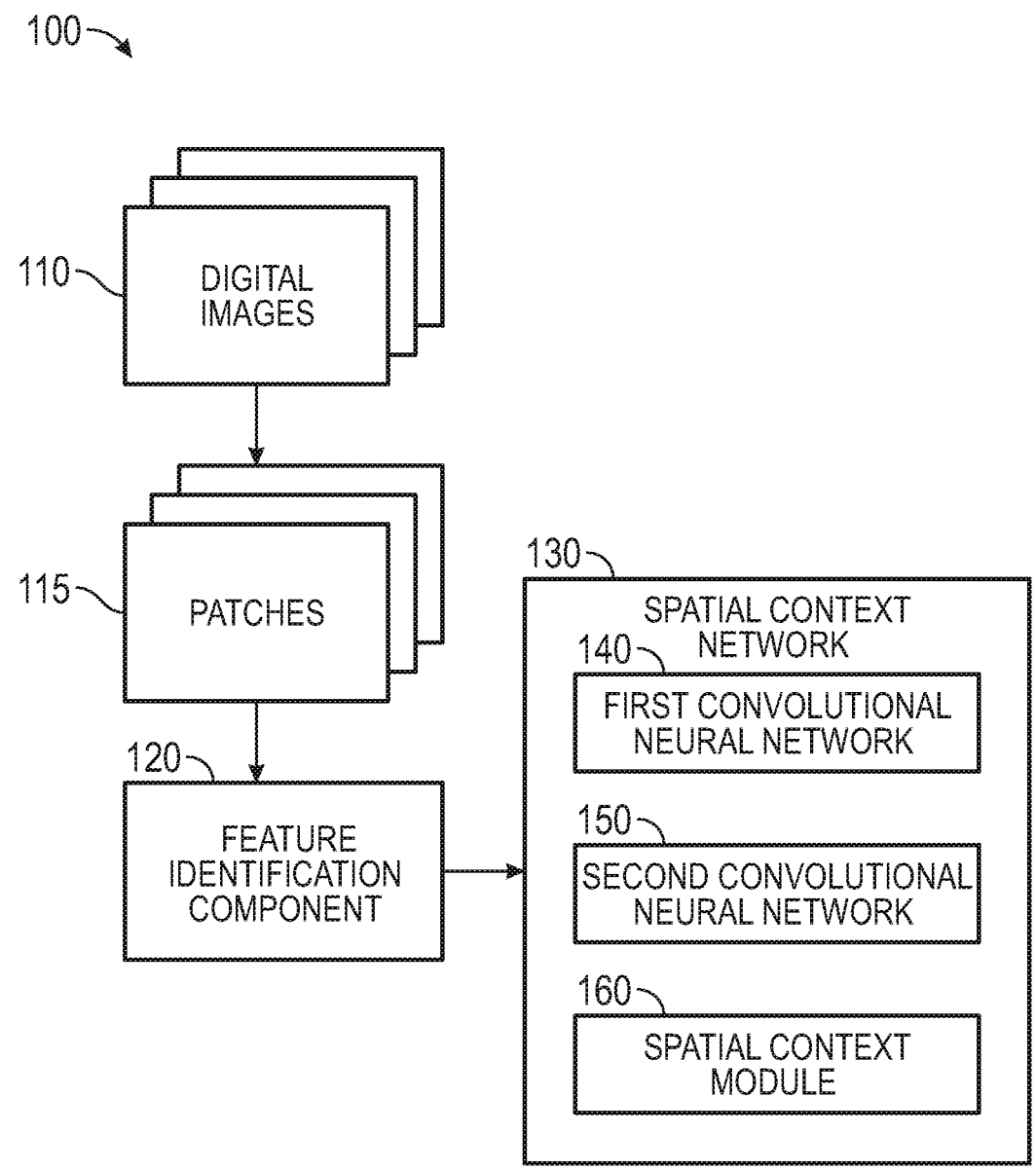
FIG. 1 is a block diagram illustrating a workflow for generating a spatial context network, according to one embodiment described herein.

Recent successful advances in object categorization, detection and segmentation have been fueled by high capacity deep learning models (e.g., convolutional neural networks (CNNs)) learned from massive labeled corpora of data (e.g., ImageNet, COCO, etc.). However, the large-scale human supervision that makes these methods effective at the same time can also limit their use. This is especially true for fine-grained object-level tasks such as detection or segmentation, where annotation efforts become costly and unwieldy at scale. One solution is to use a pre-trained model (e.g., VGG 19 trained on ImageNet) for other, potentially unrelated, image tasks. Such pre-trained models can produce effective and highly generic feature representations. However, when using such pre-trained models, fine-tuning with task-specific labeled samples is often necessary. Unsupervised learning is one way to potentially address some of these challenges. Unfortunately, despite significant research efforts unsupervised models such as auto-encoders and, more recently, context encoders have not produced representations that can rival pre-trained models, much less surpass them. Among the biggest challenges is how to encourage a representation that captures semantic-level (e.g., object-level) information without having access to explicit annotations for object extent or class labels.

Generally, embodiments provided herein provide techniques for training and using a convolutional neural network for feature recognition within digital images. One embodiment includes training a spatial context neural network using a plurality of patches cropped from a plurality of digital images. The spatial context neural network can include a first convolutional neural network configured to predict a feature representation for a first specified portion of a first digital image. Additionally, the spatial context neural network can include a second convolutional neural network configured to compute a feature representation for a second specified portion of a second digital image, as well as a spatial context module that accepts output of the first and second convolutional neural networks as input. Embodiments can refine the second convolutional neural network, by regressing features of the second convolutional neural network to features of the first convolutional neural network. The refined second convolutional neural network can then be used to extract one or more features within a first digital image, and then extracted features can then be used for other tasks on a new set of images (e.g., recognizing objects depicted within each of the new set of images).

One embodiment described herein incorporates image tokenization into training the spatial context neural network. In a particular embodiment, the image tokenization is performed at the level of objects. Generally, by working with patches at object scale, the spatial context neural network can focus on more object-centric features and potentially ignore some of the texture and color details that are likely less important for semantic tasks. That is, instead of looking at immediate regions around the patch for context and encoding the relationship between the contextual and target regions implicitly, embodiments described herein can consider potentially non-overlapping patches with longer spatial contextual dependencies and explicitly condition the predicted representation on the relative spatial offset between the two regions.

In addition, when training the spatial context neural network, embodiments can make use of a pre-trained model to extract intermediate representations. Since lower levels of CNNs have been shown to be task independent, doing so can allow for a better representation to be learned. More specifically, embodiments described herein provide a spatial context network (SCN), which is built on top of existing CNN networks and is designed to predict a representation of one (object-like) image patch from another (object-like) image patch, conditioned on the relative spatial offset between the two image patches. As a result, the spatial context neural network can learn a spatially conditioned contextual representation of the image patches. In other words, given the same input patch and different spatial offsets, embodiments described herein can learn to predict different contextual representations. For example, given a patch depicting a side-view of a car and a horizontal offset, the spatial context neural network may output a patch representation of another car (e.g., as cars may typically appear horizontally adjacent to one another on images within the training data set). However, as another example, the same input patch with a vertical offset may result in a patch representation of a plane (e.g., as when a car and a plane appear together within a single image within the images in the training data set, the plane may consistently appear vertically above the car).

Embodiments described herein can use of ImageNet pre-trained model as both initialization and to define intermediate representations. Once the spatial context neural network is trained (e.g., on pairs of patches), embodiments can use one of the two streams as an image representation that can be used for a variety of tasks, including object categorization or localization (e.g., as part of Faster R-CNN). Doing so provides an improved data model for feature recognition that is trained using spatial context as an effective supervisory signal. In other words, embodiments described herein provide a spatial context network that uses offset between two patches as a form of contextual supervision. According to various embodiments described herein, a variety of tokenization schemes can be used for mining training patch pairs.

FIG. 1 is a block diagram illustrating a workflow for generating a spatial context network, according to one embodiment described herein. As shown, the workflow 100 includes a plurality of digital images 110, which are analyzed by the feature identification component 120 to extract the plurality of patches 115. Generally, each patch represents a respective portion of one or the digital images 110 of a fixed size. For example, a first patch of the plurality of patches 115 for a digital image I could be represented as $X_i^I$. The first patch could be represented by a patch bounding box $b_i^I$ as an eight-tuple consisting of (x,y) positions of top-left, top-right, bottom-left and bottom-right corners of the bounding box.

Generally, embodiments described herein can be configured to operate with (category-independent) object proposals as a way to tokenize an image into more semantically meaningful parts. Embodiments can make predictions when recognizing features within digital images, where the predictions are on spatial category-independent object proposals (rather than, e.g., frames offset in time). Further, the spatial context network 130 can be parametrized by the real-valued offset between pairs of proposals, providing finer levels of granularity relative to conventional solutions.

Figure 2:
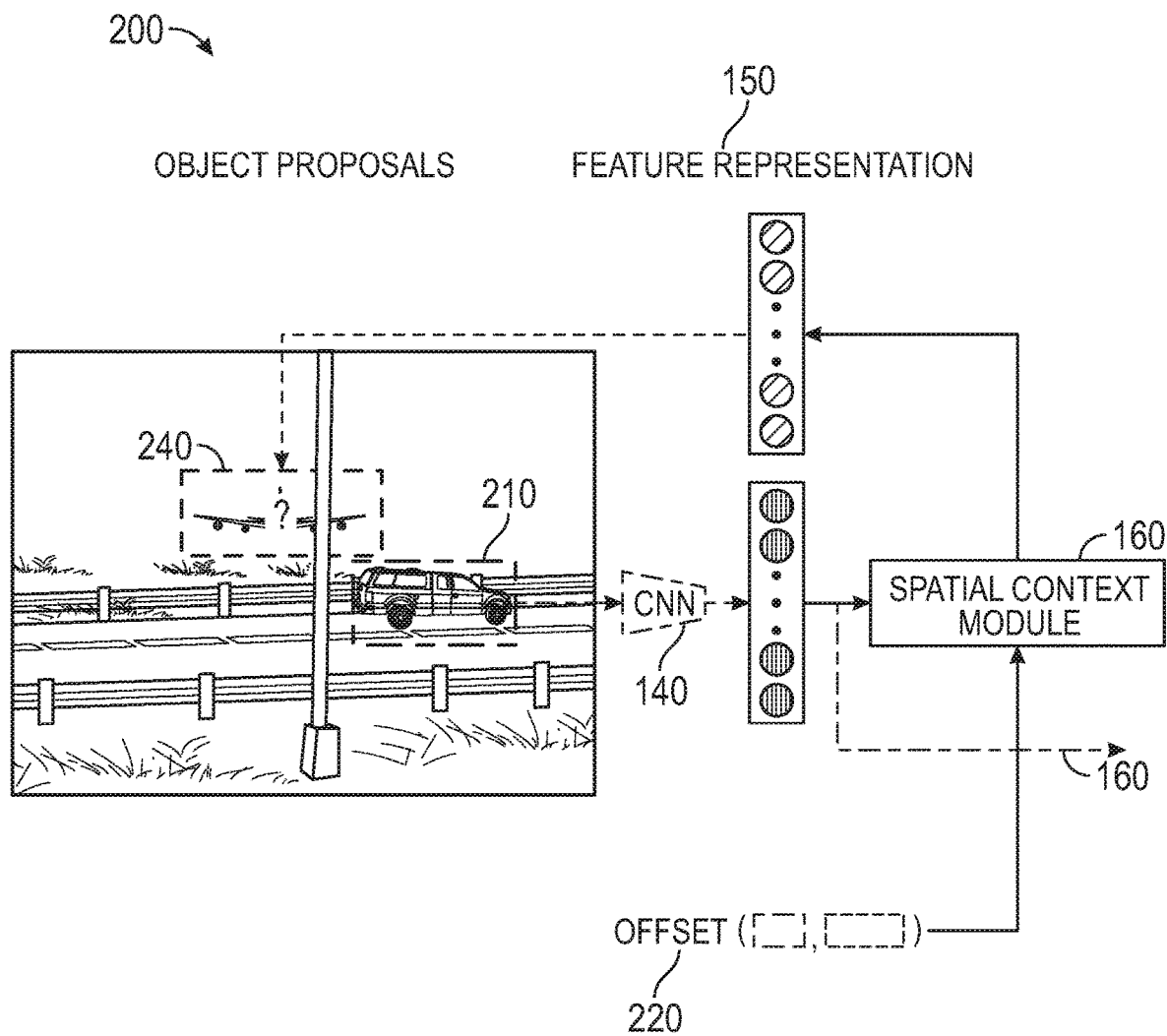
FIG. 2 is a flow diagram illustrating a method for training a convolutional neural network for feature recognition, according to one embodiment described herein.

Generally, the feature identification component 120 is configured to train the spatial context network 130 using the plurality of patches 115. As shown, the spatial context network 130 includes a first convolutional neural network 140, a second convolutional neural network 140 and a spatial context module 160. An example is shown in FIG. 2, where the flow diagram 200 illustrates a method for training a convolutional neural network for feature recognition, according to one embodiment described herein. As shown, a patch 210 is extracted from a digital image and is processed as an input into the convolutional neural network 140. As discussed above, the convolutional neural network 140 can be configured to compute a feature representation of the patch 210. The feature representation is output from the convolutional neural network 140 into the spatial context network 160, which also accepts an offset value 220. For example, the offset $o_{ij}^I$ could be determined according to $o_{ij}^I = b_i^I - b_j^I$. Generally, the offset represents the relative offset between two patches (e.g., patches 240 and 210) and is computed by subtracting locations of their respective four corners. The spatial context network 130 could be trained using a plurality of training samples represented as 3-tuples $X_i^I, X_j^I, o_{ij}^I$. The convolutional neural network 140 could be fine-tuned to predict feature representations of the patch 240, for a given feature in patch 210, based on the spatial context module 160 and the convolutional neural network 150. For example, the convolutional neural network 140 could be trained such that the model generally predicts a patch with a substantially horizontal offset relative to patch 210 could likely contain another car, while a patch with a substantially vertical offset above the patch 210 could likely contain a plane. Advantageously, refining the convolutional neural network 140 using spatial object predictions results in more accurate feature prediction by the convolutional neural network 140. The convolutional neural network 140 could then be extracted and used independently, e.g., for feature recognition analysis for digital images.

Figure 3:
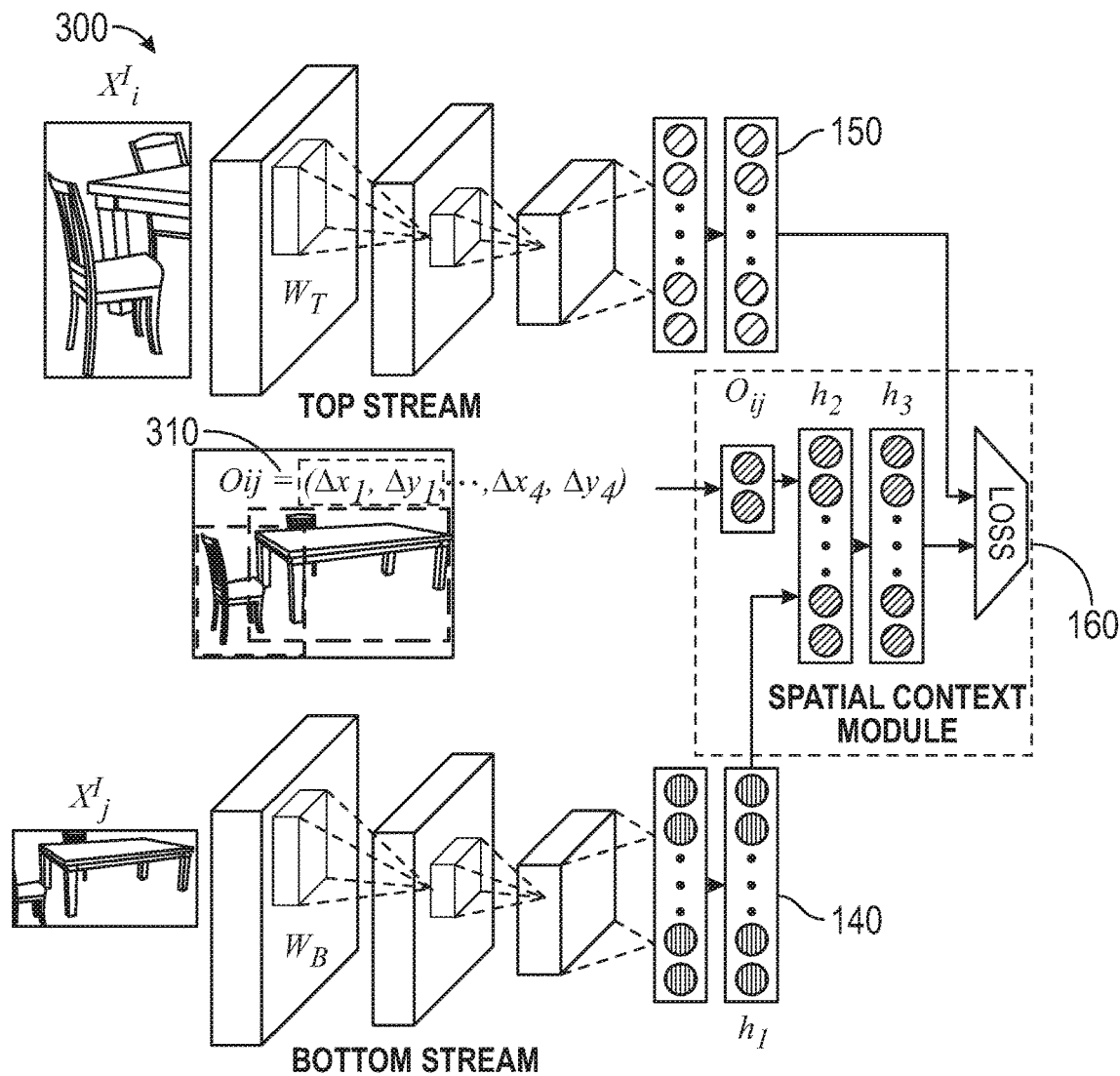
FIG. 3 illustrates a spatial context neural network, according to one embodiment described herein.

FIG. 3 illustrates a spatial context neural network, according to one embodiment described herein. As shown, the network 300 includes a top data stream for the convolutional neural network 150 and a bottom stream for the convolutional neural network 140. Generally, the goal of the top stream is to provide a feature representation for patch $X_i^I$ that will be used as soft target for contextual prediction by the learned representation of the patch $X_j^I$. In one embodiment, the top stream comprises an ImageNet pre-trained CNN such as VGG 19, GoogleNet or ResNet. However, such examples are provided for illustrative purposes only and more generally any pre-trained CNN model can be used, consistent with the functionality described herein. In a particular embodiment, the output of the top stream is the representation from the fully-connected layer (fc7) obtained by propagating patch $X_i^I$ through the original pre-trained ImageNet model. In one embodiment, the softmax layer is removed from the pre-trained model, prior to obtaining the representation.

More formally, $g(X_i^I; W_T)$ can denote the non-linear function approximated by the CNN model and parameterized by weights $W_T$. In one embodiment, the fc7 layer within the model is used for its relative simplicity and performance in many high-level visual tasks. More generally, however, according to various embodiments other layers within the model can be utilized, consistent with the functionality described herein.

The bottom data stream for the convolutional neural network 140 can represent an identical CNN model to the top stream. As shown, the output of the bottom stream feeds into the spatial context module 160, along with an offset 310 between the depicted patches within the digital image. The spatial context module 160 can then account for spatial offset between the input pair of patches. For example, the convolutional neural network 140 could map the input patch to a feature representation $h_1 = g(X_j^I; W_B)$, and then the resulting $h_1$ (fc7 representation) can be used as input for the spatial context module 160. In one embodiment, the bottom stream is initialized using the ImageNet pre-trained model, so initially $W_B = W_T$.

The spatial context module 160 is generally configured to take the feature representation of the patch $X_j^I$ produced by the bottom stream and, given the offset to patch $X_i^I$, predict the representation of patch $X_i^I$ that would be produced by the top stream. In one embodiment, the spatial context module is represented by a non-linear $f([h_1, o_{ij}]; V)$ that is parameterized by weight matrix $V = \{V_1, V_{loc}, V_2\}$. In a particular embodiment, the spatial context module 160 takes the feature vector $h_1$ that is computed from patch $X_j^I$, together with an offset vector $o_{ij}$ between $X_j^I$ and $X_i^I$, and derives an encoded representation $h_2 = \sigma(V_1 h_1 + V_{loc} o_{ij})$. Here, $V_1$ denotes a weight for $h_1$, $V_{loc}$ represents a weight matrix for an input offset, and $\sigma(x) = 1/(1+e^{-x})$. The spatial context module 160 can then map $h_2$ to $h_3$, using a linear transformation, to reconstruct a fully-connected layer feature vector computed by the first convolutional neural network 140 on the patch $X_i^I$.

Given the output feature representations from the aforementioned two streams, embodiments can train the network by regressing the features from the bottom stream to those from the top stream. In one embodiment, a squared loss function is used. In a particular embodiment, the squared loss function is defined as $\min_{V, W_B} \Sigma_{I \in I; i \neq j} \|g(X_i^I; W_T) - f([g(X_j^I; W_B), o_{ij}]; V)\|^2$. As a result, the spatial context modeul 160 can essentially provide an encoder-decoder framework, with the bottom stream encoding the input image patch into a fixed representation and the spatial context module 160 decoding the fixed representation into a representation of another, spatially offset, patch.

Advantageously, the spatial context network 130 can be trained using backpropagation with stochastic gradient descent. Note that for the top stream, rather than predicting raw pixels in images, embodiments can utilize the features extracted from off-the-shelf CNN architecture as ground truth, to which the features constructed by the bottom stream regress. That is, because the pretrained CNN model contains valuable semantic information (e.g., referred to as dark knowledge) to differentiate objects and the extracted off-the-shelf features have achieved great success on various tasks.

In an alternative embodiment, rather than formulating the problem as a regression task, the training is treated as a classification problem by appending a softmax layer on top of the two streams and predicting whether a pair of features is likely given the spatial offset. However, such an embodiment can require a significant amount of negative samples (e.g., a car is not likely to be in a lake), which in some circumstances can make training more difficult. Further, the regression loss used by the spatial context module 160 builds on studies that soft real-valued targets can often perform better than discrete labels.

Figure 4:
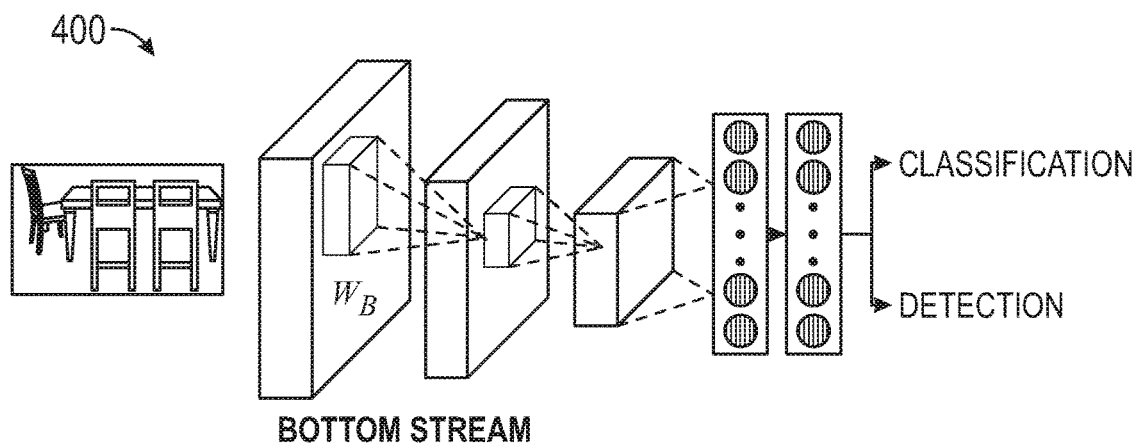
FIG. 4 illustrates a convolutional neural network trained for feature recognition, according to one embodiment described herein.

Once the spatial context network is trained, the encoded representation $h_1$ can be extracted and utilized for other tasks. An example of this is shown in FIG. 4, which illustrates a convolutional neural network trained for feature recognition, according to one embodiment described herein. As shown, the illustration 400 depicts the refined convolutional neural network 140 that has been extracted from the spatial context network. Such a refined convolutional neural network 140 could then be used, for example, for classification or object detection applications. Advantageously, the feature representations output by the refined CNN 140 are on average improved and more accurate, relative to those obtained from the original ImageNet pre-trained model for object detection and classification.

Figure 5:
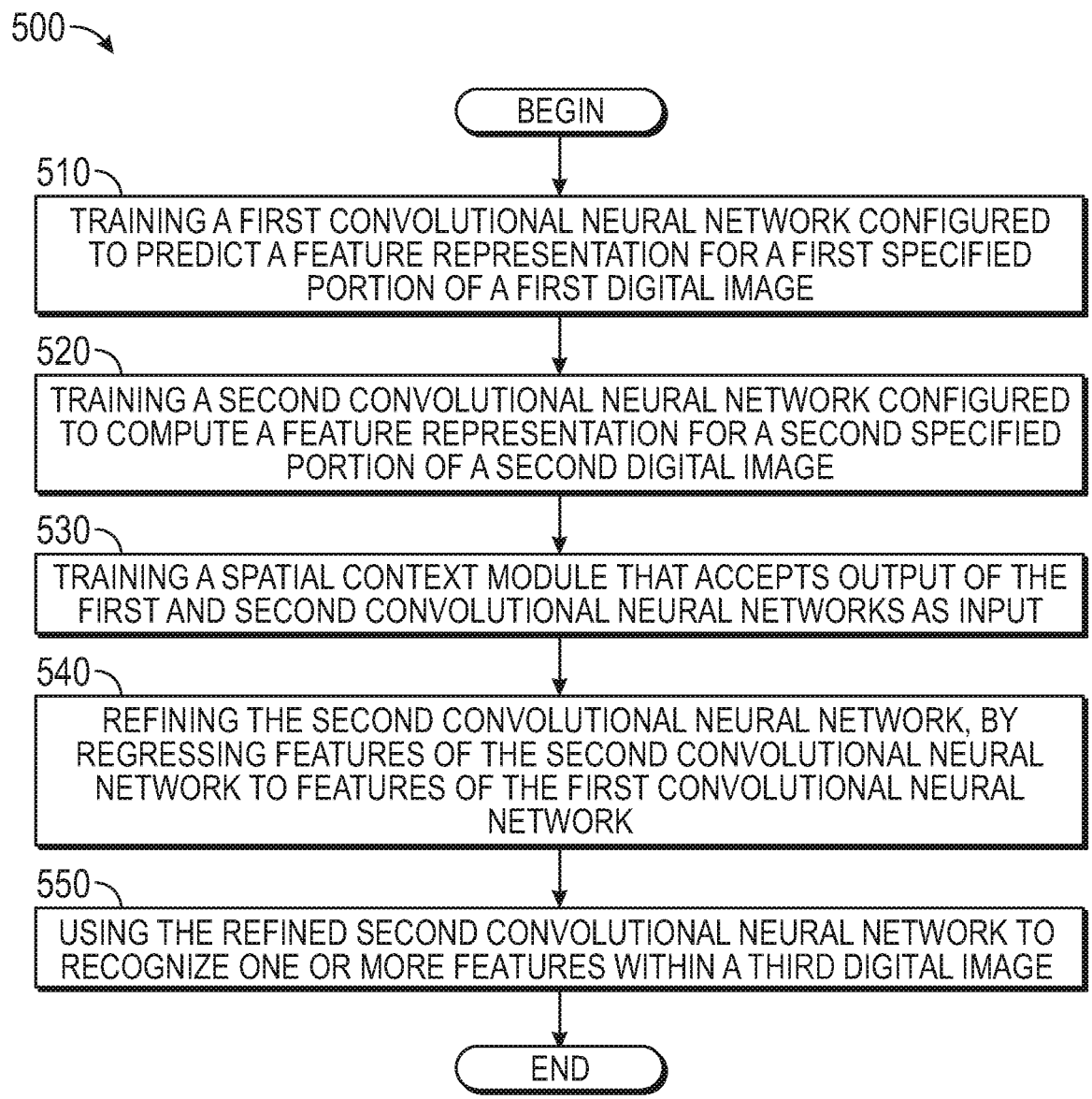
FIG. 5 is a flow diagram illustrating a method of training and using a convolutional neural network to recognize features within a digital image, according to one embodiment described herein.

FIG. 5 is a flow diagram illustrating a method of training and using a convolutional neural network to recognize features within a digital image, according to one embodiment described herein. As shown, the method 500 begins at block 510, where the feature identification component 120 trains a first CNN that is configured to predict a feature representation for a first specified portion of a first digital image. The feature identification component 120 further trains a second CNN that is configured to compute a feature representation for a second specified portion of a second digital image (block 520). The feature identification component 120 further trains a spatial context module that accepts the output of the first and second CNNs as input (block 530). The feature identification component 120 refines the second CNN, by regressing features of the second CNN to features of the first CNN (block 540). The refined second CNN can then be used for feature recognition analysis (block 550), and the method 500 ends. For example, the refined second CNN can be used for feature recognition analysis in images in a new set of digital images (e.g., a set of images that does not include the first digital image or the second digital image).

Figure 6:
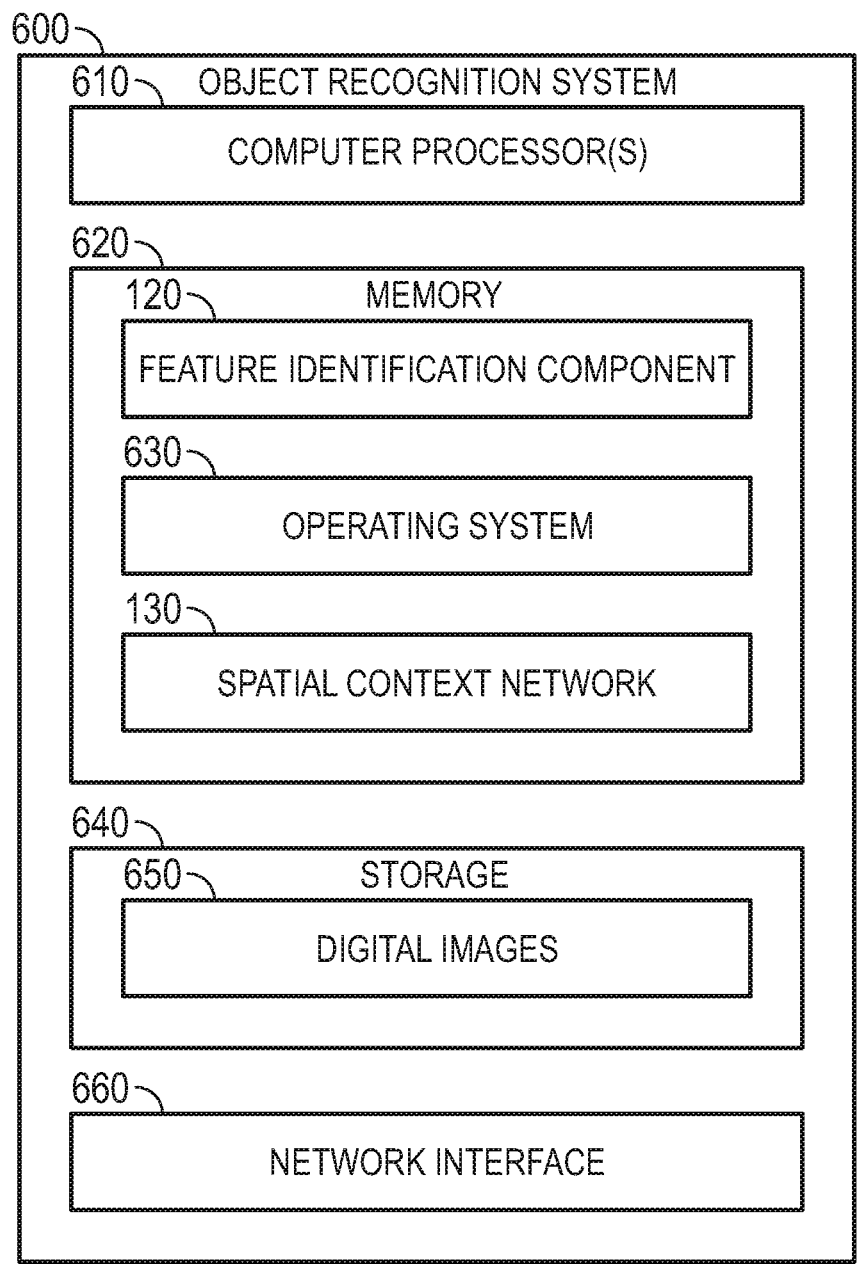
FIG. 6 is a block diagram illustrating a system configured with a feature identification component, according to one embodiment described herein.

FIG. 6 depicts one architecture of an object recognition system 600 within which embodiments of the present disclosure may be implemented. This figure in no way limits or is intended to limit the scope of the present disclosure. The object recognition system 600 may be a desktop computer, video game console, digital assistant, rendering engine, or any other device suitable for practicing one or more embodiments of the present disclosure.

As shown, the object recognition system 600 includes one or more central processing units (CPUs) 610, a memory 620, storage 640 and a network interface 650. CPU(s) 610 includes one or more processing cores, and, in operation, CPU 610 is the master processor of system 600, controlling and coordinating operations of other system components. The system memory 620 stores software applications and data for use by CPU(s) 610, and as shown, the memory 620 includes the feature identification component 120 and an operating system 630.

Storage 640 represents non-volatile storage for applications and data and may include fixed or removable hard disk drives, flash memory devices, and CD-ROM, DVD-ROM, Blu-ray, HD-DVD, or other magnetic, optical, or solid state storage devices. The storage 640 (which can be connected to the CPU 610 via an I/O bridge, not shown) may be configured to store content and applications and data for use by CPU 610. As shown, storage 640 contains digital images 650, which can represent images from a training data set that are used to train the spatial context network 130, as well as images analyzed using the spatial context network 130.

Network interface 660 allows the object recognition system 600 to communicate with other systems via an electronic communications network, and may include wired or wireless communication over local area networks and wide area networks such as the Internet. For example, the digital images 650 can be received over a data communications network by the network interface 660 (e.g., from remote camera devices) and stored in the storage 640, e.g., until analyzed by the feature identification component 120.

Figure 7:
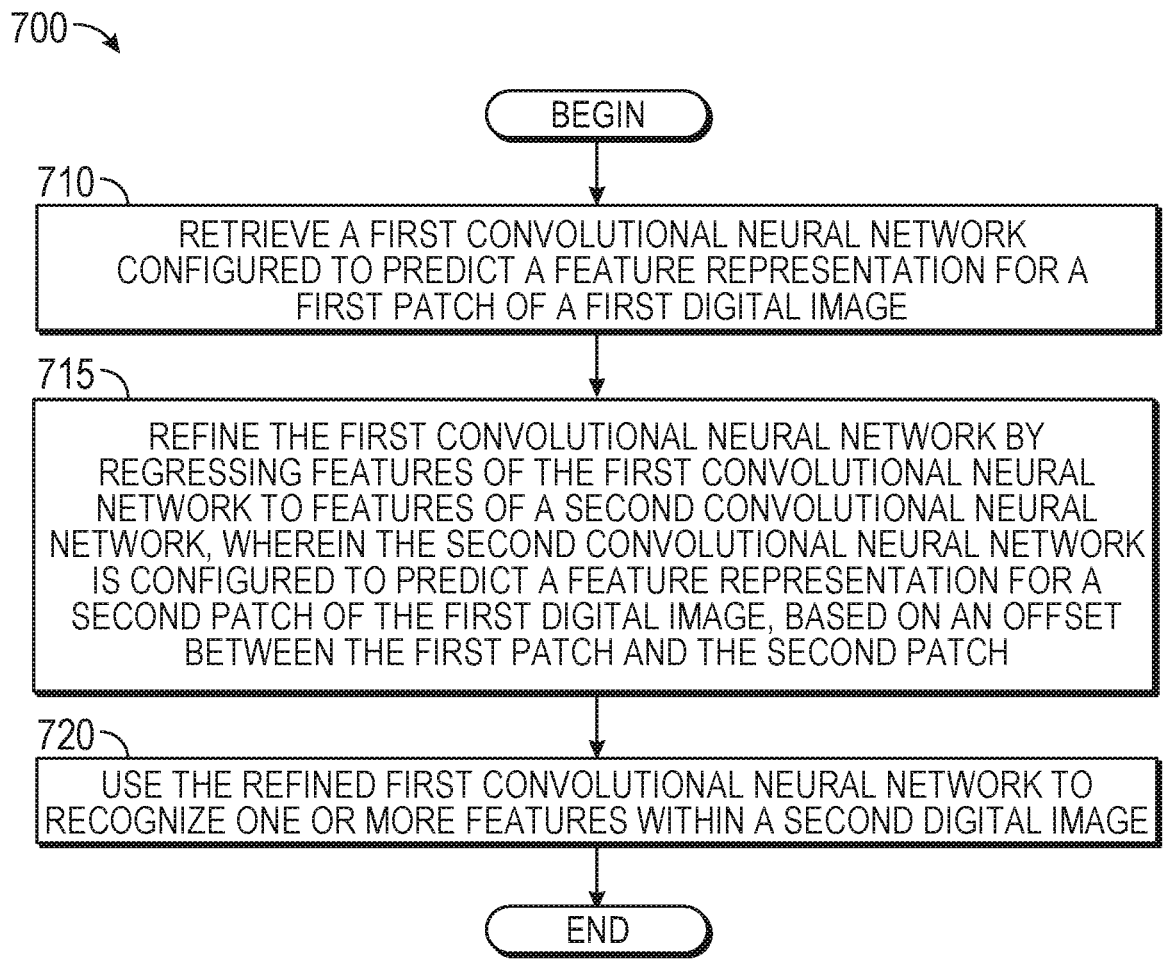
FIG. 7 is a flow diagram illustrating a method of using a convolutional neural network to recognize features within a digital image, according to one embodiment described herein.

FIG. 7 is a flow diagram illustrating a method of using a convolutional neural network to recognize features within a digital image, according to one embodiment described herein. As shown, the method 700 begins at block 710, where the feature identification component 120 retrieves a first convolutional neural network configured to predict a feature representation for a first patch of a first digital image. The feature identification component 120 refines the first convolutional neural network by regressing features of the first convolutional neural network to features of a second convolutional neural network (block 715). Generally, the second convolutional neural network is configured to predict a feature representation for a second patch of the first digital image, based on an offset between the first patch and the second patch. The feature identification component 120 uses the refined first convolutional neural network to recognize one or more features within a second digital image (block 720), and the method 700 ends.

In the preceding, reference is made to embodiments of the invention. However, it should be understood that the invention is not limited to specific described embodiments. Instead, any combination of the described features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The preceding flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method to train a spatial context neural network having a first convolutional neural network, a second convolutional neural network, and a spatial context module, the computer-implemented method comprising:
    training the first convolutional neural network, the first convolutional neural network being configured to predict a feature representation for a first patch cropped from a first position in a first digital image;
    training the second convolutional neural network, the second convolutional neural network being configured to compute a feature representation for a second patch cropped from a second position in the first digital image;
    training the spatial context module, the spatial context module comprising a neural network configured to predict the feature representation for the first patch based on the feature representation for the second patch and a relative offset between the first position and the second position in the first digital image;
    refining the second convolutional neural network by regressing features of the second convolutional neural network to features of the first convolutional neural network using a loss function of the spatial context module; and
    using the refined second convolutional neural network to recognize one or more features within a second digital image.

2. The computer-implemented method of claim 1, wherein the spatial context network uses the relative offset between the first position and the second position of the first digital image as a form of contextual supervision.

3. The method of claim 1, wherein each of the first and second patches comprises a fixed-size rectangular portion of the first digital image.

4. The computer-implemented method of claim 1, wherein the first convolutional neural network comprises a CNN_M neural network, and wherein the CNN_M neural network comprises an AlexNet convolutional neural network with five convolutional layers topped by three fully-connected layers.

5. The computer-implemented method of claim 1, wherein refining the second convolutional neural network comprises:
    tuning one or more fully-connected layers within the second convolutional neural network while leaving one or more convolutional layers fixed.

6. The computer-implemented method of claim 1, wherein refining the second convolutional neural network comprises:
    resizing at least one of the first and second patches to a predefined size;
    setting a learning rate for the second convolutional neural network to a first learning rate for a predetermined number of epochs; and
    after the predetermined number of epochs elapses, reducing the learning rate for the second convolutional neural network.

7. The computer-implemented method of claim 1, wherein the second convolutional neural network comprises a VGG_19 neural network, wherein the VGG_19 neural network comprises sixteen convolutional layers followed by three fully-connected layers.

8. The computer-implemented method of claim 1, wherein the first convolutional neural network and the second convolutional neural network are identical in structure.

9. The computer-implemented method of claim 1, wherein training the spatial context module further comprises initializing a plurality of weights within the spatial context module at least substantially randomly.

10. The computer-implemented method of claim 1, wherein the first patch is represented by a patch bounding box as an eight-tuple consisting of coordinate positions of top-left, top-right, bottom-left and bottom-right corners, wherein the spatial context neural network is trained using a plurality of training samples represented as 3-tuples, and wherein the relative offset between the first position and the second position in the first digital image is computed by subtracting locations of their respective four corners.

11. The computer-implemented method of claim 10, wherein the first convolutional neural network is trained to provide the feature representation for the first patch that is used as a soft target for contextual prediction of the feature representation of the second patch, wherein the feature representation for the first patch is a representation from a fully-connected layer obtained by propagating the first patch through an original pre-trained model.

12. The computer-implemented method of claim 11, wherein the first convolutional neural network approximates a non-linear function parameterized by a plurality of weights, wherein the feature representation for the first patch is used as input for the spatial context module.

13. The computer-implemented method of claim 12, wherein the spatial context module is configured to:
    receive as input the feature representation produced by the second convolutional neural network for the second patch, and, given the relative offset between the first position and the second position in the first digital image, predict the feature representation for the first patch, that would be produced by the first convolutional neural network, wherein the spatial context module is represented by a non-linear function that is parameterized by a weight matrix.

14. The computer-implemented method of claim 13, wherein the spatial context module accepts a feature vector that is computed from the second patch, together with an offset vector to derive an encoded representation.

15. The computer-implemented method of claim 14, further comprising:
    mapping the encoded representation using a linear transformation to reconstruct a fully-connected layer feature vector computed by the first convolutional neural network on the second patch.

16. The computer-implemented method of claim 15, wherein the loss function of the spatial context module comprises a squared loss function.

17. A system to train a spatial context neural network having a first convolutional neural network, a second convolutional neural network, and a spatial context module, the system comprising:
    one or more computer processors; and a non-transitory memory containing computer program code that, when executed by operation of the one or more computer processors, performs an operation comprising:
    training the first convolutional neural network, the first convolutional neural network being configured to predict a feature representation for a first patch cropped from a first position in a first digital image;
    training the second convolutional neural network, the second convolutional neural network being configured to compute a feature representation for a second patch cropped from a second position in the first digital image;
    training the spatial context module, the spatial context module comprising a neural network configured to predict the feature representation for the first patch based on the feature representation for the second patch and a relative offset between the first position and the second position in the first digital image;
    refining the second convolutional neural network by regressing features of the second convolutional neural network to features of the first convolutional neural network using a loss function of the spatial context module; and
    using the refined second convolutional neural network to recognize one or more features within a second digital image.

18. A non-transitory computer-readable memory containing computer program code executable by one or more computer processors to perform an operation comprising:
    retrieving a first convolutional neural network configured to predict a feature representation for a first patch cropped from a first position in a first digital image;
    retrieving a second convolutional neural network configured to predict a feature representation for a second patch cropped from a second position in the first digital image;
    retrieving a spatial context module comprising a neural network configured to predict the feature representation for the first patch based on the feature representation for the second patch and a relative offset between the first position and the second position in the first digital image;
    refining the second convolutional neural network by regressing features of the second convolutional neural network to features of the first convolutional neural network using a loss function of the spatial context module; and
    using the refined second convolutional neural network to recognize one or more features within a second digital image.

19. The computer-implemented method of claim 1, wherein the loss function comprises a squared loss function.

20. The non-transitory computer-readable memory of claim 18, wherein the loss function comprises a squared loss function.

\* \* \* \* \*

UNITED STATES PATENT AND TRADEMARK OFFICE
CERTIFICATE OF CORRECTION

PATENT NO. : 10,776,662 B2  
APPLICATION NO. : 15/808759  
DATED : September 15, 2020  
INVENTOR(S) : Leonid Sigal et al.

Page 1 of 1

It is certified that error appears in the above-identified patent and that said Letters Patent is hereby corrected as shown below:

On the Title Page

Item (56), in Column 2, under "Other Publications", Line 3, delete "Circults" and insert -- Circuits --, therefor.

In the Specification

In Column 4, Line 55, delete "$X_i^I, X_j^I, o_{ij}^I$)." and insert -- $X_i^I, X_j^I, o_{ij}^I$). --, therefor.

In Column 5, Line 54, delete "$V_{loc}$," and insert -- $V_{loc}$ --, therefor.

In Column 5, Lines 66-67, delete "modeul1 60" and insert -- module 160 --, therefor.

Signed and Sealed this  
Seventeenth Day of November, 2020

Andrei Iancu  
*Director of the United States Patent and Trademark Office*